(12) United States Patent
Takeda et al.

(10) Patent No.: US 8,148,946 B2
(45) Date of Patent: Apr. 3, 2012

(54) BATTERY PACK HAVING PROTECTION CIRCUIT FOR SECONDARY BATTERY

(75) Inventors: Takashi Takeda, Atsugi (JP); Junji Takeshita, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 365 days.

(21) Appl. No.: 12/248,952

(22) Filed: Oct. 10, 2008

(65) Prior Publication Data

US 2010/0090652 A1    Apr. 15, 2010

(51) Int. Cl.
  H02J 7/00    (2006.01)
  H02J 7/04    (2006.01)
  H02J 7/16    (2006.01)

(52) U.S. Cl. ........ 320/134; 320/135; 320/136; 320/149; 320/155

(58) Field of Classification Search .................... 320/134
See application file for complete search history.

(56) References Cited

U.S. PATENT DOCUMENTS

| | | | |
|---|---|---|---|
| 5,867,008 A * | 2/1999 | Du et al. | 320/136 |
| 2005/0077878 A1* | 4/2005 | Carrier et al. | 320/134 |
| 2006/0076930 A1* | 4/2006 | Ooshita et al. | 320/134 |
| 2006/0255768 A1* | 11/2006 | Yoshio | 320/134 |

FOREIGN PATENT DOCUMENTS

| | | |
|---|---|---|
| JP | 09 233713 | 9/1997 |
| JP | 2004-152580 | 5/2004 |

* cited by examiner

*Primary Examiner* — Edward Tso
*Assistant Examiner* — Yalkew Fantu
(74) *Attorney, Agent, or Firm* — IPUSA, PLLC

(57) ABSTRACT

A battery pack has first through third external terminals connected to positive and negative power supply terminals and a voltage detection terminal, respectively. A secondary battery is connected between the first external terminal and the third external terminal. A protection circuit controls ON/OFF of first and second switching elements provided on a wiring between the secondary battery and a load or a charge device by detecting an overcharge, an overdischarge and an overcurrent of the secondary battery. A first thermistor is connected between the second external terminal and the third external terminal. A series circuit containing a second thermistor and a resistor is provided in parallel to the secondary battery. A third switching element is connected between the second external terminal and the third external terminal. The protection circuit turns on the third switching element and shortcircuits between the second external terminal and the third external terminal when a detection is made by the second thermistor that a temperature of the secondary battery exceeds a predetermined temperature.

4 Claims, 5 Drawing Sheets

BATTERY PACK HAVING PROTECTION CIRCUIT FOR SECONDARY BATTERY

FIELD OF THE INVENTION

The present invention relates to a battery pack and, more particularly, to a battery pack equipped with a protection circuit for a secondary battery.

BACKGROUND OF THE INVENTION

In recent years, a lithium ion battery is mounted as a rechargeable battery to portable equipment such as a digital camera. Since the lithium ion battery is weak in overcharge and overdischarge, a battery pack is provided with a protection circuit for overcharging and overdischarging in many cases.

FIG. 1 and FIG. 2 are block diagrams of conventional battery packs. In the battery pack 1 shown in FIG. 1, a series circuit containing a capacitor C1 and a resistor R1 is connected in parallel to a lithium ion battery 2. A positive terminal of the lithium ion battery 2 is connected to an external terminal 3 of the battery pack 1, and a negative terminal is connected to an external terminal 4 of the battery pack 1 through n-channel MOS (metal oxidization film semiconductor) transistors M1 and M2 for current interruption.

Drains of the MOS transistors M1 and M2 are connected in common. A source of the MOS transistor M1 is connected to the negative terminal of the lithium ion battery 2. A source of the MOS transistor M2 is connected to the external terminal 4. Body diodes D1 and D2 are connected equivalently between the source and drain of the MOS transistors M1 and M2, respectively.

A protection IC (integrated circuit) 5 incorporates therein an overcharge detection circuit, an overdischarge detection circuit and an overcurrent detection circuit. The protection IC 5 operates by a power supply Vdd supplied through the resistor R1 from the positive terminal of the lithium ion battery 2 and a power supply Vss supplied from the negative terminal of the lithium ion battery 2.

The protection IC 5 shuts off the MOS transistor M1 by causing a DOUT output to be a low-level when an overdischarge or an overcurrent is detected by the overcharge detection circuit or the overcurrent detection circuit. Additionally, the protection IC 5 shuts off the MOS transistor M2 by causing a COUT output to be a low-level when an overcharge is detected by the overcharge detection circuit.

The battery pack 1 shown in FIG. 2 is further provided with a thermistor R3. An end of the thermistor R3 is connected to a terminal 6 of the battery pack 1, and the other end is connected to an external terminal 4. A predetermined voltage is applied to the terminal 6 of the battery pack 1 through a voltage-dividing resistor from a charge device when charging. A voltage of the terminal 6 changes according to a resistance value of the thermistor R3 being changed by a temperature of the battery pack. The charge device, which controls the charge, causes the charge to stop by detecting the voltage at the terminal 6 when the temperature of the battery pack 1 exceeds a predetermined value.

Patent Document 1 discloses that a temperature protection element (PTC element) does not operate even if a high-temperature is generated during a time of normal discharge by connecting to a secondary battery a diode connected in series to the temperature protection element (PTC element) and a diode connected in parallel to the these and in a reverse direction.

Patent Document 1: Japanese Laid-Open Patent Application No. 2004-152560

The battery pack shown in FIG. 1 is not provided with a protection function to the temperature of the battery pack. The battery pack shown in FIG. 2 is provided with the protection function to the temperature of the battery pack. However, because a predetermined voltage is applied to the battery pack shown in FIG. 2 from the charge device through the voltage-dividing resistor, there is a problem in that the temperature of the battery pack cannot be detected accurately and an accurate charge stop control cannot be performed if the predetermined voltage of the charge resistor varies or if there is an error in the voltage-dividing resistor of the charge device.

SUMMARY OF THE INVENTION

It is a general object of the present invention to provide a novel, useful and improved battery pack in which the above-mentioned problems are eliminated.

A more specific object of the present invention is to provide a battery pack, which can perform a temperature protection of a secondary battery, prevent self-heating when discharging, and which can perform an appropriate charge stop control.

In order to achieve the above-mentioned objects, there is provided according to the present invention a battery pack comprising: first through third external terminals connected to positive and negative power supply terminals of a charge device and a voltage detection terminal, wherein the charge device stops charging when a voltage at the voltage detection terminal is lower than a predetermined voltage; a secondary battery connected between the first external terminal and the third external terminal; a protection circuit controlling ON/OFF of first and second switching elements provided on wiring between the secondary battery and a load or the charge device by detecting an overcharge, an overdischarge and an overcurrent of the secondary battery; a first thermistor connected between the second external terminal and the third external terminal; a series circuit provided in a vicinity of the secondary battery and containing a second thermistor and a resistor connected in parallel to the secondary battery; and a third switching element connected between the second external terminal and the third external terminal, wherein the protection circuit turns on the third switching element and short-circuits between the second external terminal and the third external terminal when a detection is made by the second thermistor that a temperature of the secondary battery exceeds a predetermined temperature.

In the above-mentioned battery pack, it is preferable that the third switching element is a MOS transistor. Additionally, it is preferable that each of the first and second thermistors is an NTC thermistor having a negative temperature coefficient.

According to the present invention, temperature protection of a secondary battery can be performed with high accuracy, self-heating when discharging can be prevented, and an appropriate charge stop control can be performed.

Other objects, features and advantages of the present invention will become more apparent from the following detailed description when read in conjunction with the accompanying drawings.

DETAILED DESCRIPTION OF THE PREFERRED EMBODIMENT

Figure 1:
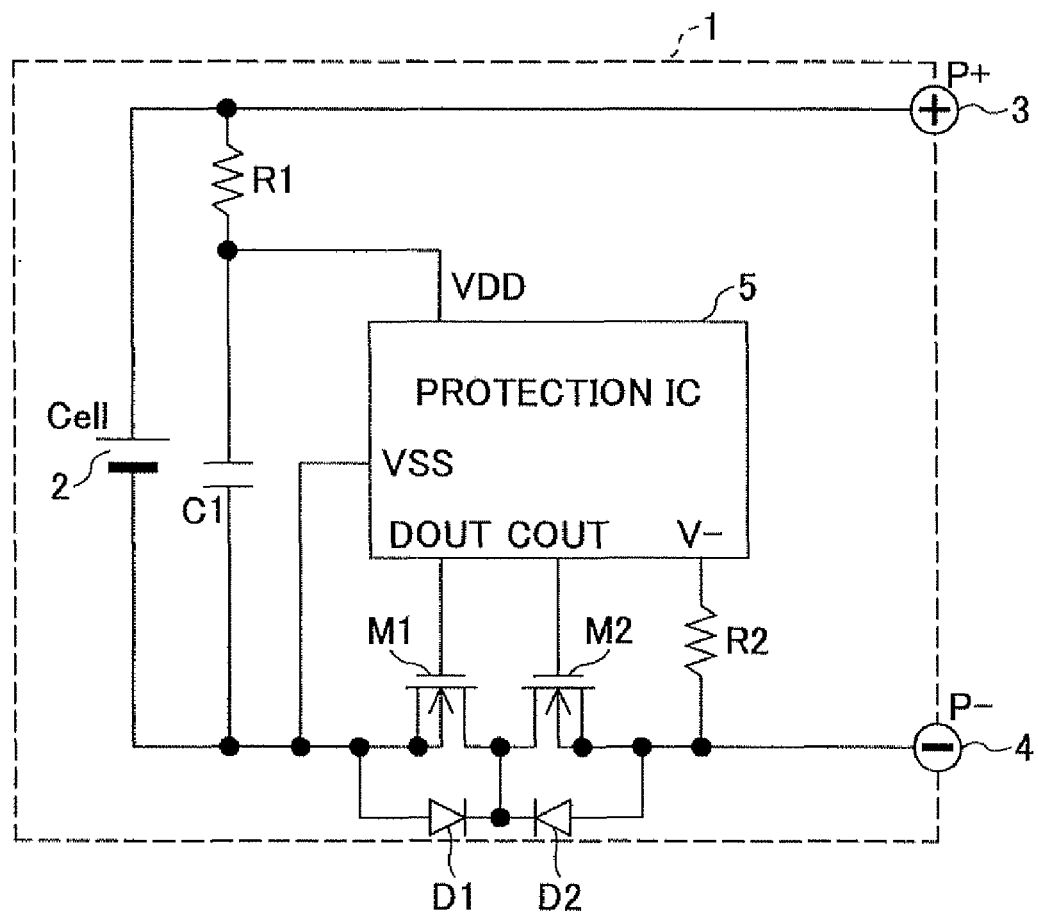
FIG. 1 is a block diagram of an example of a conventional battery pack.
Figure 2:
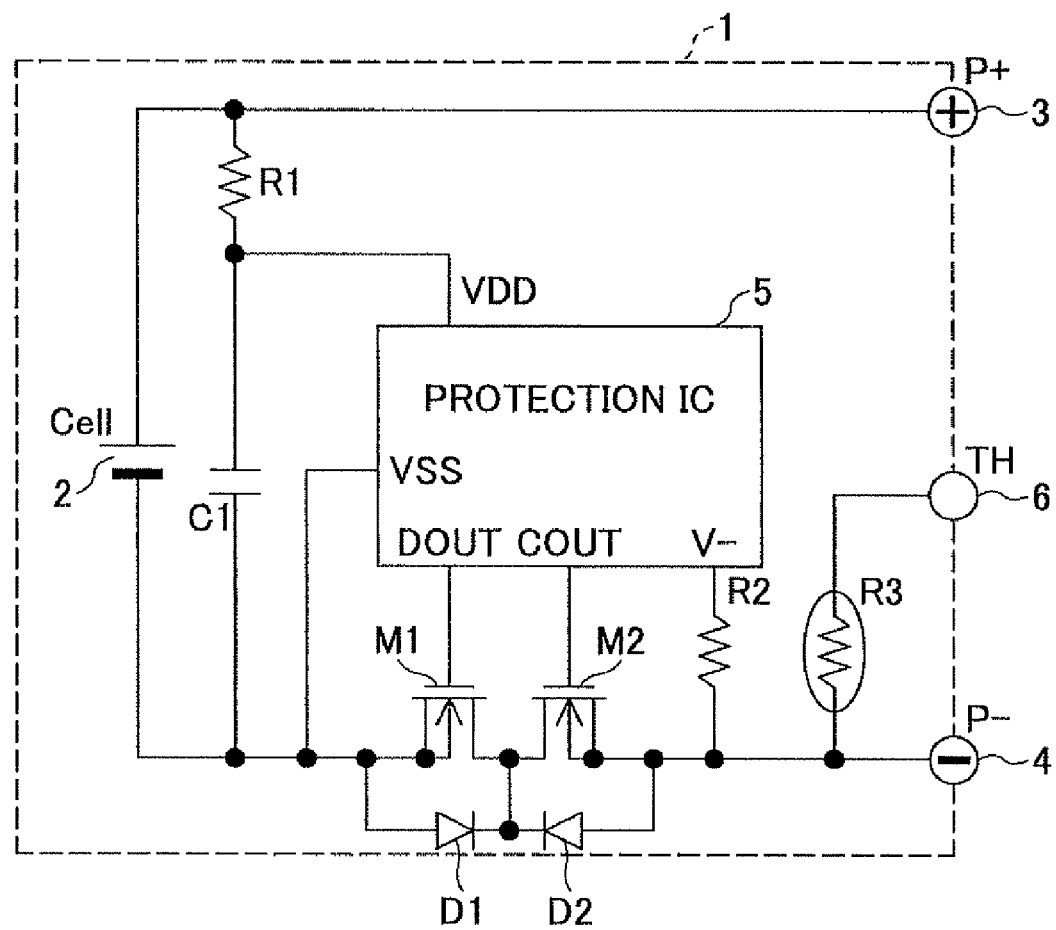
FIG. 2 is a block diagram of another example of the conventional battery pack.
Figure 3:
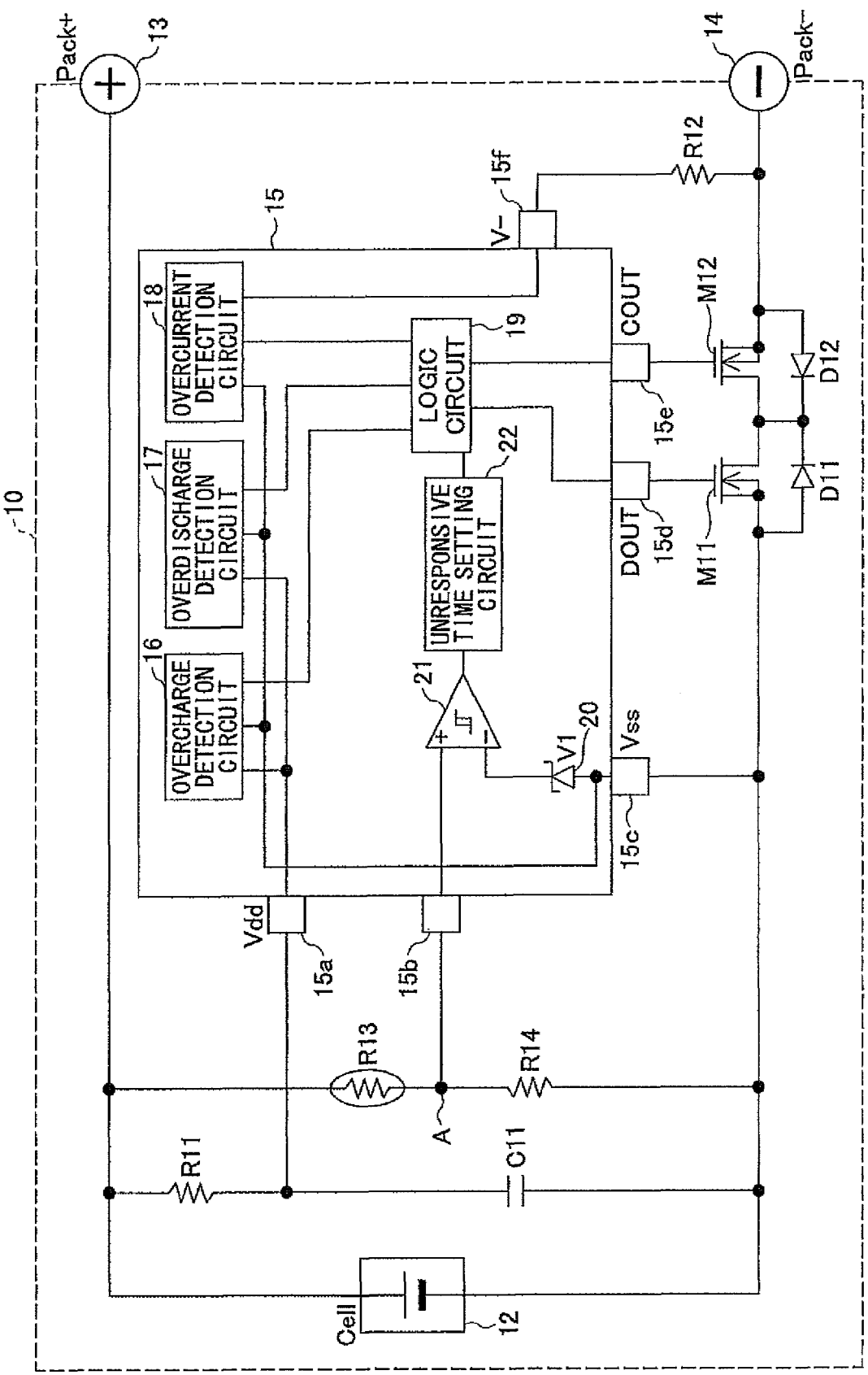
FIG. 3 is a block diagram of a battery pack to which the present invention is applied.

FIG. 3 is a block diagram of a battery pack to which the present invention is applied. In FIG. 3, a series circuit containing a resistor R11 and a capacitor C11 is connected in parallel to a lithium ion battery 12. A positive terminal of the lithium ion battery 12 is connected to an external terminal 13 of the battery pack 10 by wiring. A negative terminal of the lithium ion battery 12 is connected to an external terminal 14 of the battery pack 10 by wiring through n-channel MOS transistors M11 and M12 for current interruption.

Drains of the MOS transistors M11 and M12 are connected commonly. A source of the MOS transistor M11 is connected to the negative terminal of the lithium ion battery 12. A source of the MOS transistor M12 is connected to the external terminal 14. Body diodes D11 and D12 are connected equivalently between the sources and the drains of the MOS transistors M11 and M12, respectively.

A series circuit containing a thermistor R13 and a resistor 14 is connected in parallel to the lithium ion battery 12. The thermistor R13 is arranged in the vicinity of the lithium ion battery 12 within the battery pack 10 in order to be thermally coupled with the lithium ion battery 12. An NTC (Negative Temperature Coefficient) thermistor having a negative temperature coefficient is used as the thermistor 13.

Figure 4:
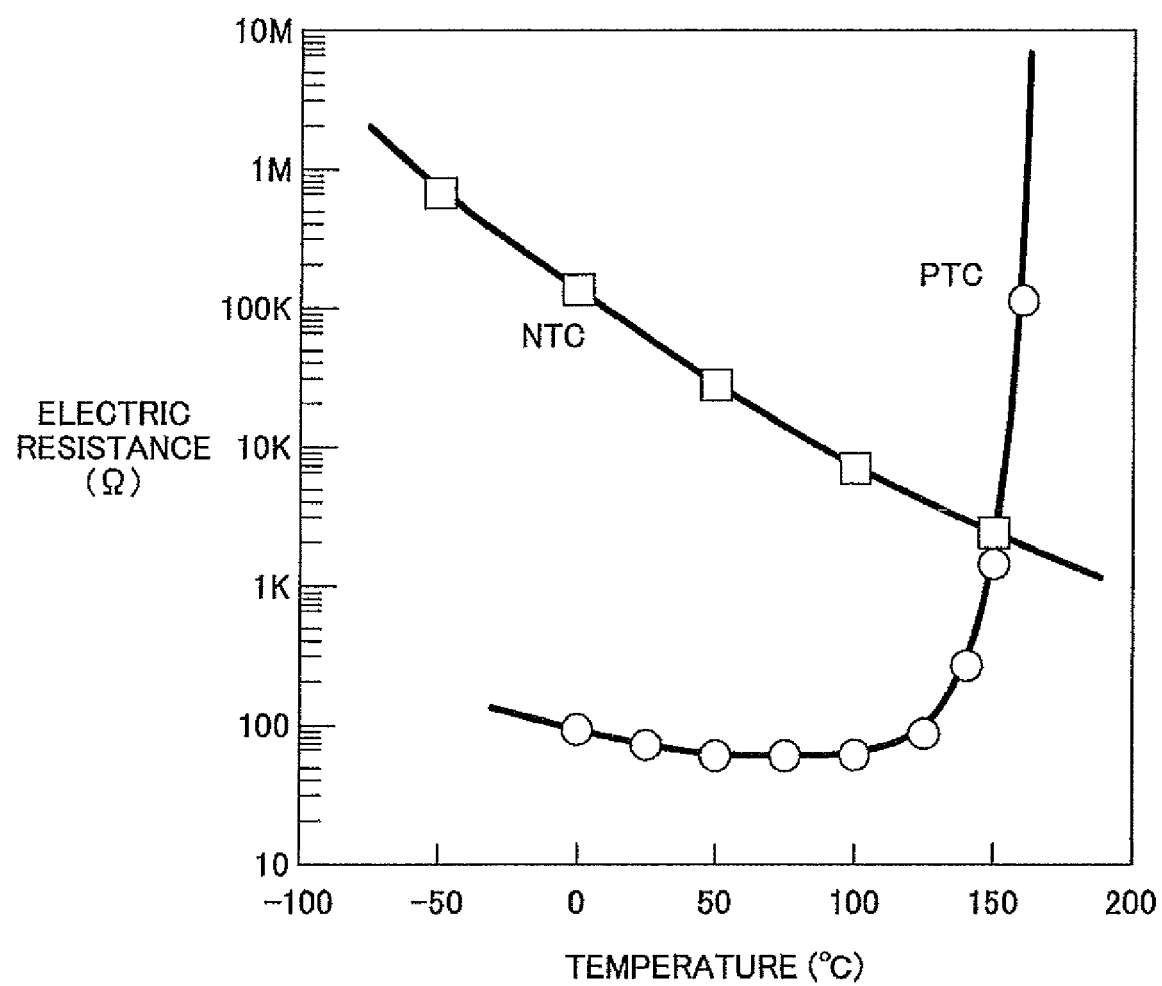
FIG. 4 is a graph showing a temperature-resistance characteristic of each of an NTC thermistor and a PTC thermistor.

FIG. 4 shows a temperature-resistance characteristic of each of an NTC thermistor having a negative temperature coefficient and a PTC (Positive Temperature Coefficient) thermistor having a positive temperature coefficient.

A protection IC 15 incorporates therein an overcharge detection circuit 16, an overdischarge detection circuit 17 and an overcurrent detection circuit 18. A power supply Vdd is supplied to a terminal 15a of the protection IC 15 through a resistor R11 from the positive terminal of the lithium ion battery 12. A power supply Vss is supplied to a terminal 15c of the protection IC 15 from the negative terminal of the lithium ion battery 12.

The overcharge detection circuit 16 detects an overcharge of the lithium ion battery 12 from the voltages at the terminals 15a and 15c, and supplies a detection signal to a logic circuit 19. The overdischarge detection circuit 17 detects an overdischarge of the lithium ion battery 12 from the voltages at the terminals 15a and 15c, and supplies a detection signal to the logic circuit 19. The overcurrent detection circuit 18 detects an overcurrent, which is an excessive current flowing through a resistor R12, from the voltages of the terminals 15c and 15f, and supplies a detection signal to the logic circuit 19.

A connection point A of the thermistor R13 and the resistor R14 is connected to a terminal 15b of the protection IC 15. An end of the resistor R12 is connected to a terminal 15f of the protection IC 15. The other end of the resistor R12 is connected to the external terminal 14. A terminal 15d of a DOUT output of the protection IC 15 is connected to a gate of the MOS transistor M11. A terminal 15e of a COUT output of the protection IC 15 is connected to a gate of the MOS transistor M12.

In the protection IC 15, the terminal 15b is connected to a noninverting input terminal of a comparator 21. The terminal 15c is connected to a negative terminal of a constant voltage source 20 such as a Zener diode. A positive terminal of the constant voltage source 20 is connected to an inverting input terminal of the comparator 21.

The thermistor R13 is an NTC thermistor having a negative temperature coefficient, and a resistance value of the thermistor R13 decreases as a temperature increases as shown in FIG. 4 and a voltage of the connection point A rises.

The comparator 21 has a hysteresis characteristic. The comparator 21 compares a constant voltage V1 generated by the constant voltage source 20 and the voltage at the connection point A, and outputs a high-level signal when the voltage of the connection point A is higher than the constant voltage V1. That is, if the detection temperature of the thermistor R13 exceeds a predetermined temperature (for example, 70° C.) corresponding to the constant voltage V1, the comparator 21 outputs a high-temperature detection signal of a high-level.

The high-temperature detection signal output by the comparator 21 is supplied to a nonresponsive time setting circuit 22. The nonresponsive time setting circuit 22 supplies the high-temperature detection signal to the logic circuit 19 if a high-level period of the high-temperature detection signal exceeds a predetermined value (for example, 0.5 sec).

The detection signals are supplied from each of the overcharge detection circuit 16, the overdischarge detection circuit 17 and the overcurrent detection circuit 18 to the logic circuit 19, and also the high-temperature detection signal output by the nonresponsive time setting circuit 22 is supplied to the logic circuit 19.

The logic circuit 19 shuts off the MOS transistor M12 by causing the COUT output of the terminal 15e to be a low level when the overcharge detection signal is supplied from the overcharge detection circuit 16. Additionally, the logic circuit 19 shuts off the MOS transistor M11 by causing the DOUT output of the terminal 15d to be a low level when the overdischarge detection signal is supplied from the overdischarge detection circuit 17. Further, the logic circuit 19 shuts off the MOS transistor M11 by causing the DOUT output of the terminal 15d to be a low level when the overcurrent detection signal is supplied from the overcurrent detection circuit 18.

The logic circuit 19 shuts off the MOS transistor M12 by causing the COUT output of the terminal 15e to be a low level when the high-temperature detection signal turns into a high level. Thereby, the temperature of the lithium ion battery 12 can be detected accurately and the lithium ion battery 12 can be protected by stopping a charge when the lithium ion battery 12 is at a high temperature.

Because an NTC thermistor having a resistance value varying linearly with respect to a temperature as indicated in FIG. 4 is used as the thermistor R13, the temperature can be detected with good accuracy. The temperature of the lithium ion battery 12 can be detected with good accuracy by arranging the thermistor R13 in the vicinity of the lithium ion battery 12 in the battery pack 10. In addition, because the resistance value of a PCT thermistor increases rapidly if a certain temperature is exceeded, the PTC thermistor cannot detect temperature with sufficient accuracy when compared to an NTC thermistor.

In the meantime, if a load is connected between the external terminals 13 and 14 and when the MOS transistor M12 is shut off by causing the COUT output to be a low level, the DOUT output is at a high level and the MOS transistor M11 is turned on, and, therefore, the body diode D12 of the MOS transistor M11 is turned on and a discharge current from the lithium ion battery 12 flows to the load connected between the external terminals 13 and 14.

In this case, if a normal direction voltage drop of the body diode D12 is set to Vf and a discharge current is set to Id, electric power Wd, expressed by Wd=Vf×Id, is released as a heat. For this reason, there is a possibility that the battery pack 10 is heated further. In an embodiment mentioned below, an appropriate charge stop control is achieved while preventing such self-heating.

Figure 5:
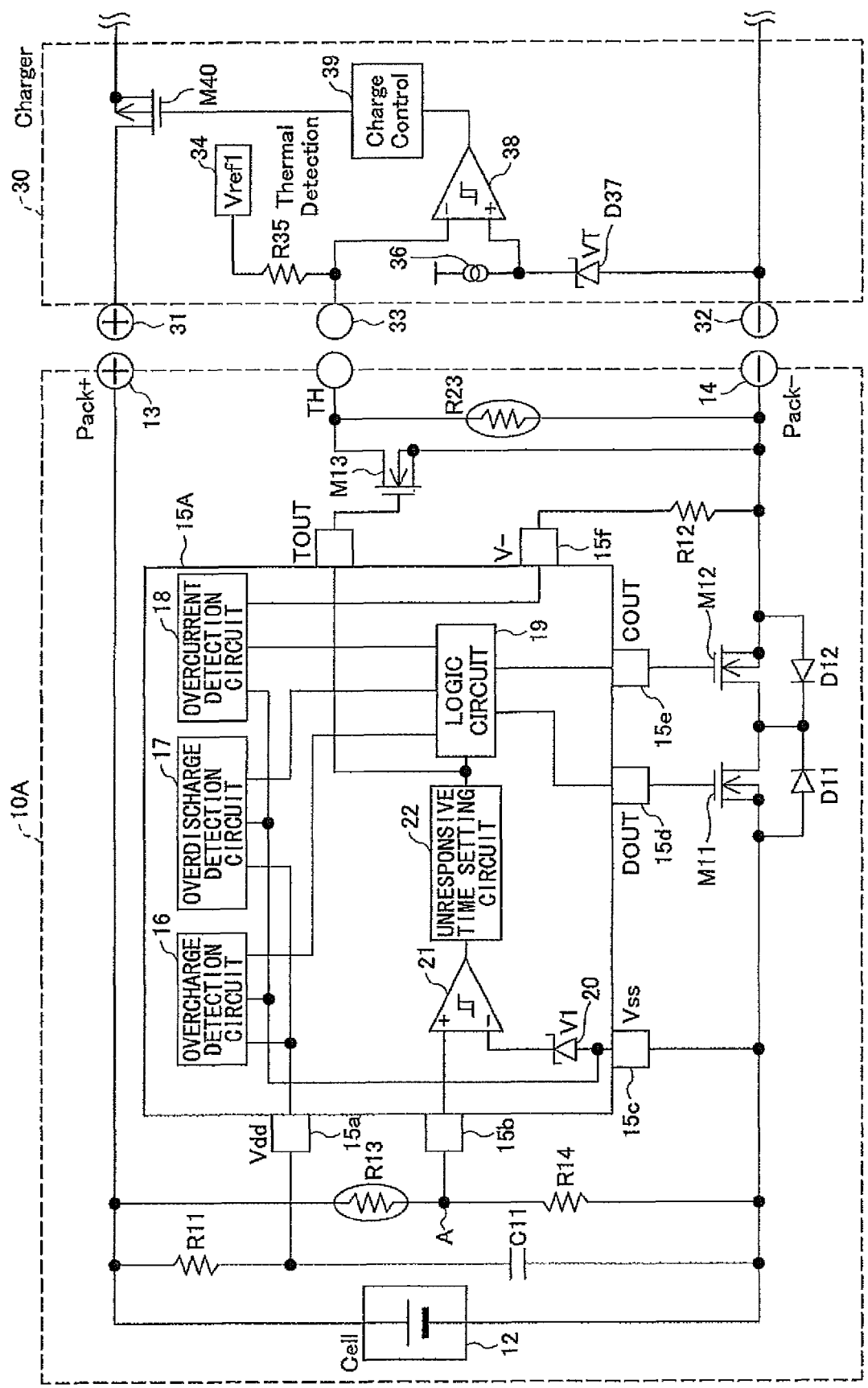
FIG. 5 is a block diagram of a battery pack according to an embodiment of the present invention.

FIG. 5 is a block diagram of the battery pack according to the embodiment of the present invention. In FIG. 5, parts that are the same as the parts shown in FIG. 3 are given the same reference numerals.

The battery pack 10A according to the present embodiment is a battery pack, which is charged by being connected to a charge device 30 having three terminals. First, a description is given of the charge device 30.

The charge device 30 has a terminal 31, a terminal 32 and a terminal 33 that are connected to the external terminal 13 and the external terminal 14 of the battery pack 10A and an external terminal TH mentioned later, respectively. The terminal 31 is a positive power supply terminal. The terminal 32 is a negative power supply terminal. The terminal 33 is a voltage detection terminal for detecting a voltage between the terminal 32 and the terminal 33. The charge device 30 has a reference voltage 34, a resistor R35, a current source 36, a diode D37, a comparator 38, a charge control circuit 39, and a MOS transistor M40.

A voltage generated by dividing the reference voltage 34 by the resistor R35 and a resistance between the terminal 32 and the terminal 33, that is, a voltage between the terminal 32 and the terminal 33, is input to one of inputs of the comparator 38. A predetermined voltage VT generated by the current source 36 and the diode 37 is input to the other of the inputs of the comparator 38. The output of the comparator 38 changes when the voltage between the terminal 32 and the terminal 33 becomes lower than the predetermined voltage VT. The output of the comparator 38 is input to the charge control circuit 39.

The charge control circuit 39 controls ON/OFF of the MOS transistor M40 in accordance with, for example, a charge current or a charge voltage. When the battery pack having a thermistor is connected between the terminal 32 and the terminal 33, the charge control circuit 39 detects a temperature rise of the battery pack and stops charging the battery pack. In the present embodiment, if the voltage between the terminal 32 and the terminal 33 drops below the predetermined voltage VT due to a drop in the resistance value of the thermistor, the charge control circuit 39 becomes inactive and the MOS transistor 40 is turned off, thereby stopping the charge to the battery pack.

Specifically, when the voltage between the terminal 32 and the terminal 33 dropped below the predetermined voltage VT, the output of the comparator 38 changes to a low level. The charge control circuit 39 switches between active and nonactive based on the output of the comparator 38. When the output of the comparator 38 is changed into the low level, the charge control circuit 39 becomes nonactive, and performs a control to turn off the MOS transistor M40. That is, the charge control circuit 39 turns off the MOS transistor M40 when the voltage between the terminal 32 and the terminal 33 becomes lower than the predetermined voltage VT to stop the charge to the battery pack. In the present embodiment, a p-channel MOS transistor is used as the MOS transistor M40. A constant current source may be used instead of the reference voltage 34.

Next, a description is given of the battery pack 10A according to the present embodiment. In the battery pack 10A according to the present embodiment, when the battery pack 10A becomes a high temperature, a control to cause the charge device 30 to stop charging is performed.

The battery pack 10A according to the present embodiment corresponds to the battery pack 10 shown in FIG. 3 provided with a third external terminal TH, a thermistor R23 connected in parallel between the third external terminal TH and the external terminal 14, and a MOS transistor M13.

A protection IC 15A in the present embodiment has an output terminal Tout, which outputs a signal from the nonresponsive time setting circuit 22. The output terminal Tout is connected to a gate of the MOS transistor M13. If the detected temperature by the thermistor R13 exceeds a predetermined temperature and a high-temperature detection of a high level is output from the nonresponsive time setting circuit 22, the high-level signal from the output terminal Tout is applied to the gate and the MOS transistor M13 is turned on. In the present embodiment, an n-channel MOS transistor is used as the MOS transistor M13.

Here, a description is given of a case where the battery pack 10A according to the present embodiment is connected to the charge device 30.

The external terminals 13, 14 and TH of the battery pack 10A are connected to the terminals 31, 32 and 33 of the charge device 30, respectively.

When the battery pack 10A and the charge device 30 are connected, the voltage between the terminal 32 and the terminal 33 of the charge device 30 is a divided voltage generated by dividing the reference voltage 34 by the resistor R35 and the thermistor R23. In the present embodiment, the thermistor R23 is set to a value so that the voltage between the terminal 32 and the terminal 33 becomes higher than the predetermined voltage VT when the battery pack 10A is connected to the charge device 30. In the present embodiment, an NTC thermistor is used as the thermistor R23. In the charge device 30, if the resistance of the thermistor R23 decreases due to a rise in the temperature of the battery pack 10A, the divided voltage generated by dividing the reference voltage 34 by the resistor 35 and the thermistor R23 (the voltage between the terminal 32 and the terminal 33) is decreased. If the resistance of the thermistor R23 decreases until the divided voltage becomes equal to the predetermined voltage VT, the charge device stops the charge to the battery pack 10A.

If the high-temperature detection signal of a high level is output from the nonresponsive time setting circuit 22 in a state where the battery pack 10A is connected to the charge device 30, the high-level signal output from the output terminal Tout of the protection IC 15A is applied to the gate of the MOS transistor M13. Thereby, the MOS transistor M13 is turned on. When the MOS transistor M13 is turned on, the external terminal 14 of the battery pack 10A and the external terminals TH are short-circuited, and the voltage between the terminal 32 and the terminal 33 becomes lower than the predetermined voltage VT. If the voltage between the terminal 32 and the terminal 33 becomes lower than the predetermined voltage VT, the output of the comparator 38 varies, and the charge control circuit 39 turns off the MOS transistor M40. Thereby, the charge device 30 stops the charge to the battery pack 10A.

Thus, when the detection temperature of the thermistor R13 exceeds the predetermined temperature, the voltage between the external terminal 14 and the external terminal TH can be set to be equal to or lower than the predetermined voltage VT because the battery pack 10A according to the present embodiment is equipped with the MOS transistor M13. For this reason, the battery pack 10A is capable of stopping the charge from the charge device 30 to the battery pack 10A in accordance with the temperature control on the side of the battery pack 10A.

Therefore, even if the predetermined voltage VT of the charge voltage VT has changed or there is an error in the dividing resistance of the charge device 30, it is able to surely stop the charge by the charge device 30 by causing the charge device 30 to detect that the battery pack 10 has become a high-temperature.

Moreover, in the battery pack 10A according to the present embodiment, because the charge stop control is performed by the MOS transistor M13, there is no need to turn off the MOS transistor M12 to stop the charge by the charge device 30. Therefore, even if the high-temperature detection signal is output from the nonresponsive time setting circuit 22, the logic circuit 19 causes the COUT output of the terminal 15e to be a high level in order to turn on the MOS transistor M12. Accordingly, the body diode D12 does not turn on, and self-generation of heat by the battery pack 10A can be prevented.

Thus, with the battery pack 10A according to the present embodiment, an appropriate charge stop control can be performed while preventing self-heating.

As mentioned above, the battery pack 10A according to the present embodiment comprises: the first through third external terminals 13, 14 and TH connected to the positive and negative power supply terminals 31 and 32 of the charge device and the voltage detection terminal, wherein the charge device stops charging when a voltage at the voltage detection terminal is lower than a predetermined voltage; the secondary battery 12 connected between the first external terminal and the third external terminal; the protection circuit 15A controlling ON/OFF of the first and second switching elements M11 and M12 provided on a wiring between the secondary battery 12 and a load or the charge device 30 by detecting an overcharge, an overdischarge and an overcurrent of the secondary battery 12; the first thermistor R23 connected between the second external terminal 14 and the third external terminal TH; the series circuit provided in the vicinity of the secondary battery 12 and containing the second thermistor R13 and the resistor R14 connected in parallel to the secondary battery; and the third switching element M13 connected between the second external terminal 14 and the third external terminal TH. The protection circuit 15A turns on the third switching element M13 and short-circuits between the second external terminal 14 and the third external terminal TH when a detection is made by the second thermistor R13 that a temperature of the secondary battery 12 exceeds a predetermined temperature. Thereby, temperature protection of the secondary battery can be performed with high accuracy, self-heating when discharging is prevented, and an appropriate charge stop control can be achieved.

It is preferable that the third switching element M13 is a MOS transistor. Additionally, it is preferable that each of the first and second thermistors R23 and R13 is an NTC thermistor having a negative temperature coefficient.

The present invention is not limited to the specifically disclosed embodiments, and variations and modifications may be made without departing from the scope of the present invention.

The present application is based on Japanese priority application No. 2007-205726 filed Aug. 7, 2007, the entire contents of which are hereby incorporated herein by reference.

What is claimed is:

1. A battery pack comprising:
    first through third external terminals connected to positive and negative power supply terminals of a charge device and a voltage detection terminal, respectively, wherein the charge device stops charging when a voltage at the voltage detection terminal is lower than a predetermined voltage;
    a secondary battery connected between said first external terminal and said third external terminal;
    a protection circuit controlling ON/OFF of first and second switching elements provided on wiring between said secondary battery and a load or said charge device by detecting an overcharge, an overdischarge and an overcurrent of said secondary battery;
    a first thermistor connected between said second external terminal and said third external terminal;
    a series circuit provided in a vicinity of said secondary battery and containing a second thermistor and a resistor connected in parallel to said secondary battery; and
    a third switching element provided in said battery pack separately from said first and second switching elements and connected between said second external terminal and said third external terminal,
    wherein said protection circuit turns on said third switching element, independently from said first and second switching elements, and short-circuits between said second external terminal and said third external terminal when a detection is made by said second thermistor that a temperature of said secondary battery exceeds a predetermined temperature.

2. The battery pack according to claim 1, wherein said third switching element is a MOS transistor.

3. The battery pack according to claim 2, wherein each of said first and second thermistors is an NTC thermistor having a negative temperature coefficient.

4. The battery pack according to claim 1, wherein each of said first and second thermistors is an NTC thermistor having a negative temperature coefficient.

* * * * *